United States Patent [19]

Johnston et al.

[11] 3,914,927
[45] Oct. 28, 1975

[54] IMPLEMENT GAGING DEVICE

[75] Inventors: Edward J. Johnston, La Grange; Frank J. Macha, Jr., Lockport; Charles D. DeVries, Plainfield, all of Ill.

[73] Assignee: International Harvester Company, Chicago, Ill.

[22] Filed: Mar. 18, 1974

[21] Appl. No.: 452,100

[52] U.S. Cl. .................................................. 56/377
[51] Int. Cl.[2] ........................................ B01D 46/02
[58] Field of Search ........................... 56/377, 328 R

[56] References Cited
UNITED STATES PATENTS

| | | | |
|---|---|---|---|
| 3,527,040 | 9/1970 | Teagle | 56/370 |
| 3,626,677 | 12/1971 | Sides | 56/328 R |
| 3,834,142 | 9/1974 | Johnston | 56/377 |

Primary Examiner—G. E. McNeill
Attorney, Agent, or Firm—Dennis K. Sullivan; Floyd B. Harman

[57] ABSTRACT

A ground gaging device is provided for a crop-engaging farm implement, the gaging device supporting a part of the weight of the implement and having a ground engaging base member mounted thereon for rotation in a generally horizontal plane and having a plurality of rod-like crop-engaging members disposed adjacent the periphery thereof and projecting upwardly therefrom. In a preferred embodiment the base member is provided with a convex lower surface and the rotational axis diverges downwardly away from the implement to cause rotation of the base member in a direction whereby the crop-engaging members will carry crops laterally toward the implement.

19 Claims, 3 Drawing Figures

IMPLEMENT GAGING DEVICE

CROSS REFERENCES TO RELATED APPLICATIONS

This application is related to application Ser. No. 368,143, filed June 8, 1973, and now abandoned entitled "Side Delivery Rake," and application Ser. No. 368,144, filed June 8, 1973, and now U.S. Pat. No. 3,834,142 entitled "Side Delivery Rake," both of the above applications being assigned to the Assignee hereof.

BACKGROUND OF THE INVENTION AND PRIOR ART

This invention relates to an improved gaging device for a crop-engaging farm implement, such as a side delivery rake or a hay pickup, and more particularly, to a gaging device for a side delivery rake floatably mounted on the front of a tractor, such as that described in the above-referred-to related applications.

In the related applications, the device used for gaging the minimum height of the rake from the ground was a skid shoe adjustably attached to the rake frame and aligned with the direction of travel. It has been found that such a skid shoe, while performing the gaging functions satisfactorily possesses the disadvantage of having crops become entangled with and hairpinned around its mounting structure, particularly when crossing windrows as might be done in a field of irregular shape. Other known gaging means, such as wheels or casters or the roller skids described in Pool U.S. Pat. No. 2,488,738, which rotate about a fore and aft axis, having the same problem in varying degrees.

Another problem which may occur with this type of equipment is that the operating width of the implement may prove to be insufficient to accommodate large swaths or to handle a pair of windrows, especially if the spacing therebetween becomes excessive. Others have attempted a solution to this by mounting a vertical wheel-rake wheel at the end of a parallel bar rake, the wheel being chain driven therefrom. However, this rake wheel did not gage the rake assembly from the ground and, indeed, could not since that would damage the tines.

SUMMARY OF THE INVENTION

Accordingly, an object of the invention described herein is to provide a gaging device for a floatably-mounted crop-engaging implement, the device being rotatable about a generally vertical axis to reduce the possibility of crops becoming hairpinned therearound.

It is further an object of the invention to provide a gaging device which extends the effective operating width of the implement on which it is mounted.

Another object of the invention is to provide a rotatable gaging device wherein rotation is induced by contact of the device with the ground or crops lying thereon.

A more specific object of the invention is to provide a device for gaging the minimum height of a floatably-mounted crop-engaging implement from the ground which rotates due to ground contact to move crops laterally toward the implement.

In accordance with the invention, a gaging device is provided for a crop-engaging implement, the device being rotatably mounted to the frame of the implement and extending generally downwardly therefrom to a ground contacting base member, preferably having a convex lower surface, the rotational axis preferably diverging laterally away from the implement to induce rotation of the base member upon contact with the ground. A plurality of crop engaging members are disposed about the periphery of the base member and extend upwardly therefrom and rotate therewith, preferably to move engaged crops toward the implement.

BRIEF DESCRIPTION OF THE DRAWINGS

Other objects and the advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
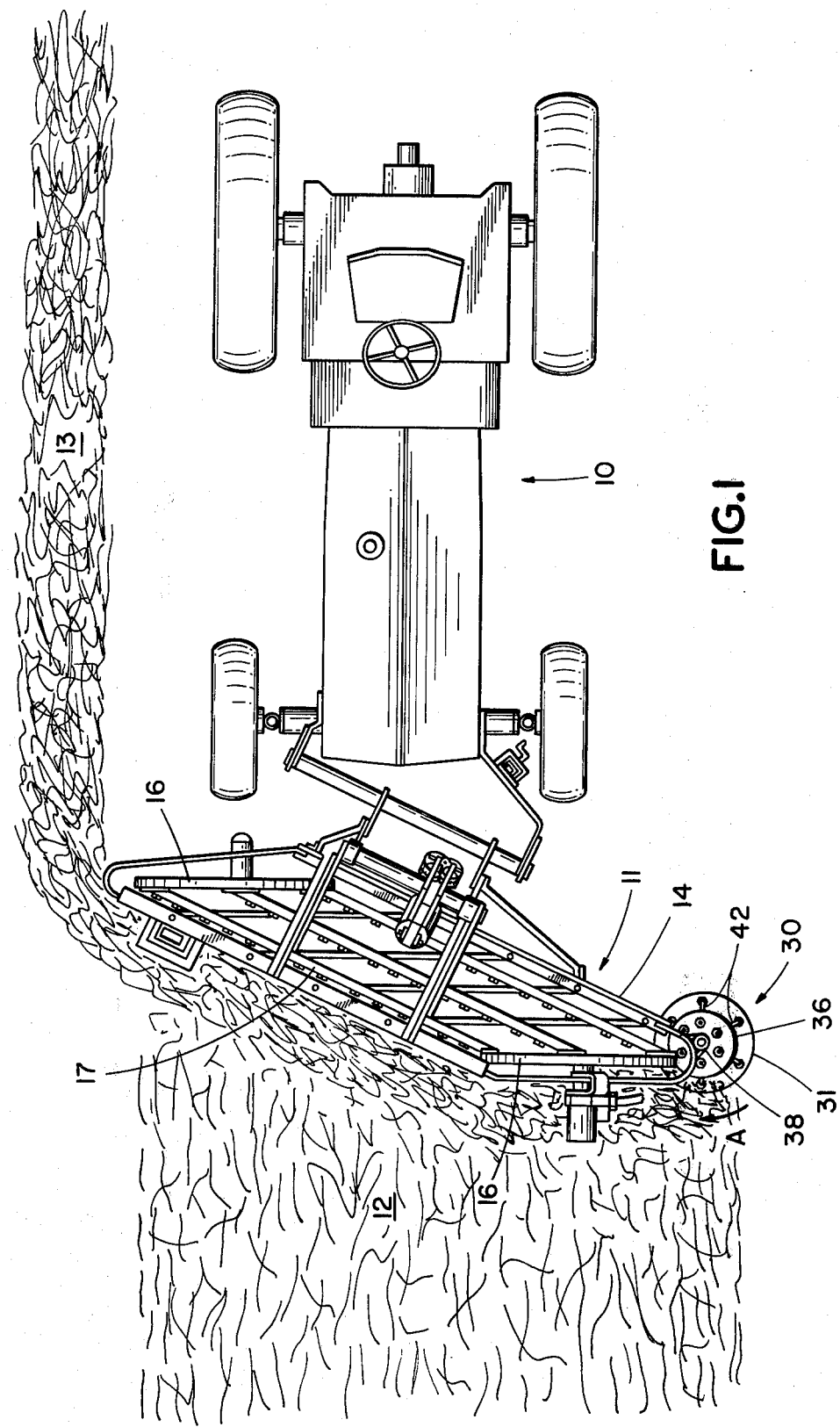
FIG. 1 is a top view of a tractor mounted side delivery rake incorporating applicants' gaging device.

Turning first to FIG. 1, there is shown a tractor generally designated 10 having a parallel bar side delivery rake assembly generally designated 11 floatably mounted on the front end thereof, the rake 11 being illustrated combining a swath 12 of cut crops and moving them laterally into a windrow 13, although it will be appreciated that rake is also useful for combining pairs of windrows into a single large windrow.

Figure 2:
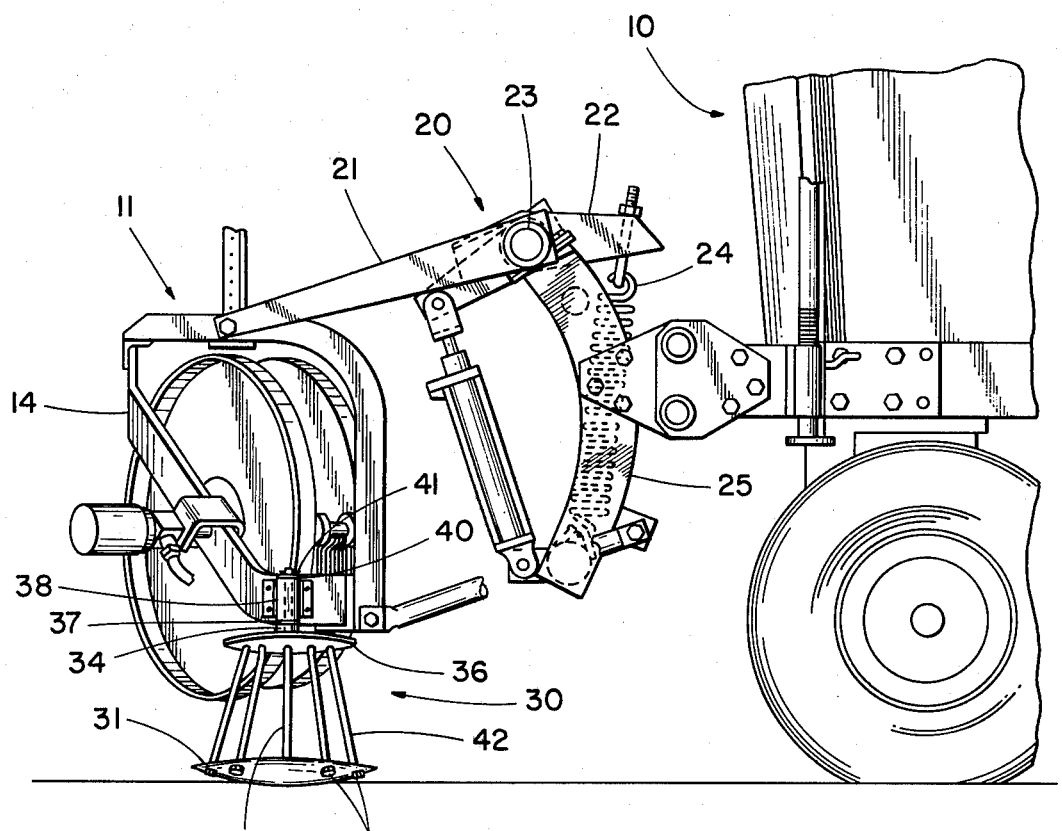
FIG. 2 is a side view of a portion of the tractor-rake combination of FIG. 1.
Figure 3:
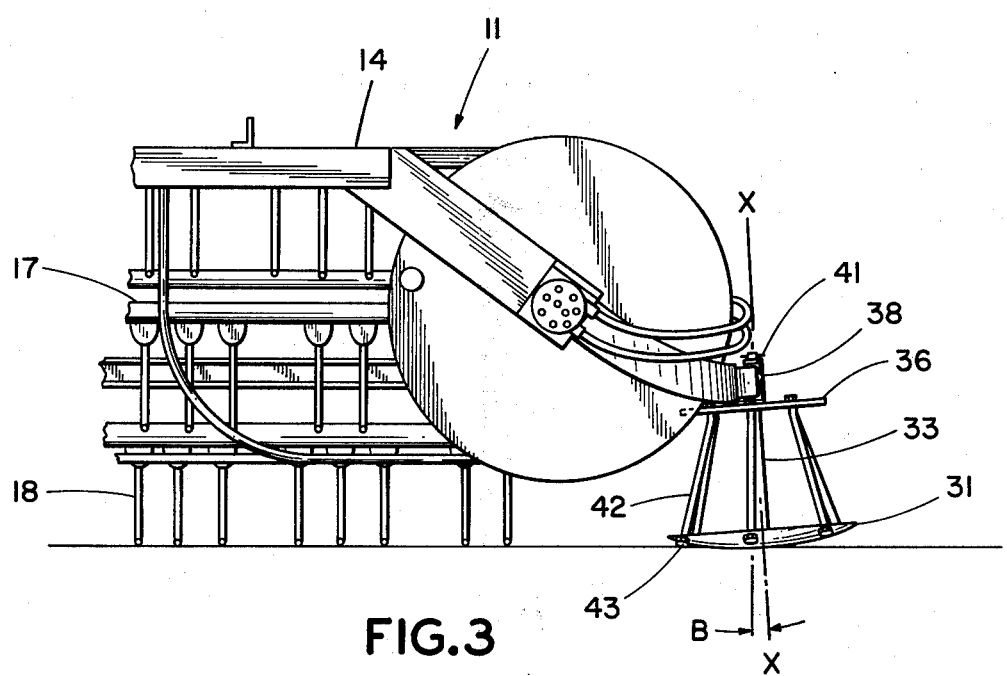
FIG. 3 is a front view of a portion of the rake of FIG. 1.

The rake assembly 11 generally comprises a laterally elongated frame 14 having a pair of disk-like members 16 mounted at each end for vertical rotation in the transverse direction. Four rake bars 17 carrying a plurality of tines 18 interconnect the disks 16 and are rotatably mounted thereto. As best seen in FIG. 2, the rake frame 14 is floatably mounted on the tractor 10 through a mounting apparatus generally designated 20, the apparatus 20 comprising generally a four-bar parallel linkage wherein the upper links 21 and balancing link 22 are fixed to a rockshaft 23 and a balancing spring 24 interconnects the link 22 with the mounting frame 25 to counterbalance most of the weight of the rake assembly 11, the remainder of the weight of the rake assembly being supported by the gaging device generally designated 30. For those interested in a detailed description of the rake assembly, the mounting apparatus, and the drive and lift means therefore, reference may be had to the above-referred-to copending applications.

In accordance with the invention, the gaging device 30, which is used to gage the minimum height of the rake assembly from the ground thereby preventing damaging contact of the rake tines 18 with the ground, comprises a ground-engaging base member 31 with a convex lower surface, the surface preferably comprising a portion of a sphere. A shaft 33 is fixedly connected to the upper side of the base member 31 as by welding and extends upwardly to a hub 34 of upper plate member 36 which is attached as by welding to the shaft 33 intermediate the ends thereof. The shaft 33 continues upwardly from the hub 34 through a thrust washer 37 and is journalled, as by bushings, in a mounting bracket 38, a second thrust washer 40 and cotter pin 41 combining with the thrust washer 37 and hub 34 to limit the axial play of the shaft 33 in the mounting bracket 38.

The mounting bracket 38 is bolted to the frame 14 of the rake and is provided with a number of bolt holes to provide for adjustment of the gaging height of the gaging device 30. The journal in the mounting block 38 is angled so that the shaft 33 will diverge downwardly laterally away from the rake frame to produce rotation of the gaging device about the axis "X—X" in the direction "A" as shown in FIG. 1, although it will be appreciated that if the feature of carrying the crops into the operating area of the rake is not desired, the axis "X—X" may be vertical. It will be appreciated that the rotation of the gaging device is induced by the contact of the convex surface of the base member with the ground at a point remote from the axis of rotation.

A plurality of crop-engaging members or rods 42, preferably six in number, are attached to and equally spaced adjacent the periphery of the base member 31. The rods 42 extend upwardly from the base member 31 to the upper plate member 36 whereat they are attached thereto at locations disposed sufficiently inwardly from the periphery to provide a crop catching overhang, thereby preventing crops from riding up and over the plate 37 and hairpinning around the hub 34. The lower ends of the rods 42 preferably extend through the base member 31 whereat they receive nuts 43 to attach them thereto. The nuts 43 which generally contact the ground in operation serve to provide a more positive means for rotating the gaging device. With these positive means, even a flat surface could be used on the base member 31.

Turning now to specific details and features of the gaging device, the lower surface of the base member 31 has been described as convex. We have found it preferable to use the blank of a spherical section harrow disk of about 16 inches in diameter as the base member 31 although a conical disk would also be suitable. With the particular spherical disk, it was found that an angle B of the rotational axis "X—X" relative to the vertical of about five degrees was necessary to induce sufficient rotation of the gaging device. Of course, the angle B could be any angle sufficient to produce a substantial component of rotation in a horizontal plane, that is, less than about 45°.

Thus, it is apparent that there has been provided, in accordance with the invention, a gaging device that fully satisfies the objects, aims, and advantages set forth above. While the invention has been described in conjunction with a specific embodiment thereof, it is evident that many alternatives, modifications, and variations will be apparent to those skilled in the art in light of the foregoing description. For example, the convex lower surface of the base member 31 might be a surface of revolution rather than a solid surface. Accordingly, it is intended to embrace all such alternatives, modifications, and variations that fall within the spirit and broad scope of the appended claims.

We claim:

1. A gaging device for an implement, said implement having a frame carrying crop-engaging apparatus, comprising:

a ground engaging base member;

means for rotatably mounting said base member to said frame for rotation about an axis permitting a substantial component of rotation in a horizontal plane, said base member engaging the ground at a point spaced from the axis of rotation for ground induced rotation thereof and supporting at least a portion of the weight of said frame; and crop-engaging means attached to said base member adjacent the periphery thereof and projecting generally upwardly therefrom.

2. The invention in accordance with claim 1 wherein the direction of rotation of said base member is such as to permit crops engaged by said crop-engaging means to be moved toward said implement crop-engaging apparatus.

3. The invention in accordance with claim 1 and said base member having a convex surface on the lower side thereof.

4. The invention in accordance with claim 1 and said crop-engaging means projecting below said base member, said crop-engaging means contacting the ground to positively induce rotation of said base member.

5. The invention in accordance with claim 1 and said mounting means including means for adjusting the position of said base member relative to said frame.

6. The invention in accordance with claim 1 wherein said axis diverges downwardly laterally away from said implement crop-engaging apparatus.

7. The invention in accordance with claim 1 and said crop-engaging means comprising a plurality of rods spaced about the periphery of said base member.

8. The invention in accordance with claim 3 and said base member being a circular disk having a spherical lower surface.

9. The invention in accordance with claim 8 and ground engaging means projecting below said lower surface to positively induce rotation of said base member.

10. The invention in accordance with claim 5 and said mounting means comprising a bracket attached to said frame and a shaft journalled in said bracket and connected to said base member.

11. The invention in accordance with claim 6 wherein the angle of said axis is less than 45° from vertical.

12. The invention in accordance with claim 6 and said axis being at an angle of at least about 5° from vertical.

13. The invention in accordance with claim 7 wherein said crop-engaging means comprises six equally spaced rods.

14. The invention in accordance with claim 13 and the upper ends of said rods being interconnected by an upper plate spaced from said base member, whereby said base member, rods, and upper plate form a rotatable cage-like structure.

15. The invention in accordance with claim 14 and the peripheral edge of said upper plate extending radially outwardly from said rods to prevent crops from riding upwardly beyond said rods.

16. In combination with a tractor-mounted side delivery rake, said rake having a frame and means for floatably mounting said frame from said tractor, a device for gaging said rake from the ground comprising:

mounting means attached to said rake frame;

a shaft journalled in said mounting means, said shaft extending generally downwardly from said frame;
rod means attached through means to said saft intermediate the ends thereof for rotation therewith, said rod means spaced from and extending generally longitudinally of said shaft to form a cage-like periphery thereabout; and a ground-engaging member attached at the base of said shaft for supporting a portion of the weight of rake, said ground-engaging member being disposed to cause rotation of said cage-like periphery by the contact of said base member with the ground upon the forward travel of said tractor.

17. The invention in accordance with claim 16 and said ground-engaging member comprising a disk-like structure having a convex lower surface, said shaft diverging downwardly away from said rake to produce contact of said member with the ground at a point displaced from said shaft.

18. The invention in accordance with claim 18 and said rod means attached to said base member adjacent the periphery thereof.

19. The invention in accordance with claim 18 and said rod means comprising a plurality of rods equally spaced about said periphery.

* * * * *